United States Patent [19]
Todd

[11] Patent Number: 5,465,933
[45] Date of Patent: Nov. 14, 1995

[54] TREE STAND BOW HOLDER RELEASABLY COUPLED TO A TREE STAND

[76] Inventor: Glen L. Todd, 311 Running Rd., Jacksonville, N.C. 28546

[21] Appl. No.: 285,815

[22] Filed: Aug. 4, 1994

[51] Int. Cl.$^6$ ............................................. F16M 11/00
[52] U.S. Cl. ................................. 248/201; 182/187
[58] Field of Search .................... 124/86, 88, 23.1; 182/187; 248/201, 214, 220.2, 222.1, 231.9, 309.1, 309.2

[56] References Cited

U.S. PATENT DOCUMENTS

| | | | |
|---|---|---|---|
| 4,729,363 | 3/1988 | Skyba | 124/23.1 |
| 4,936,415 | 6/1990 | Williams | 124/23.1 X |
| 5,186,276 | 2/1993 | Craig | 124/23.1 X |

*Primary Examiner*—Ramon O. Ramirez

[57] ABSTRACT

A tree stand bow holder releasably coupled to a climbing or ladder-type tree stand comprising a pair of spaced U-shaped brackets, each with parallel legs, positionable in a common plane and attachable to a lower portion of the tree stand, the parallel legs of each U-shaped member constituting a bow rest fabricated of steel with a plastic coating, the brackets also including a plate with an aperture mountable to the bottom edge of the tree stand with the legs in an outwardly facing horizontal orientation; a bow holder associated with one bracket, the bow holder consisting of a disk having a tube with threaded apertures therethrough, formed with the disk as a threaded cylindrical extension projecting from the disk, the disk being positionable on the top side of the legs with the threaded tube extending therethrough for coupling purposes by a threaded rod adapted to be threadably secured into the stabilizer hole of a bow; and an elastic strap having opposed ends, each opposed end having an aperture with a hook removably secured therethrough, the hooks adapted to be suspended to a tree stand with the central extent of the strap extending down and around the central extent of the bow.

4 Claims, 3 Drawing Sheets

TREE STAND BOW HOLDER RELEASABLY COUPLED TO A TREE STAND

BACKGROUND OF THE INVENTION

1. Field of the Invention

The present invention relates to tree stand bow holder releasably coupled to a tree stand and more particularly pertains to removably coupling a bow to a climbing type or ladder type tree stand for hunting convenience to abate damage to the bow.

2. Description of the Prior Art

The use of devices for supporting bows and other sporting and hunting equipment is known in the prior art. More specifically, devices for supporting bows and other sporting and hunting equipment heretofore devised and utilized for the purpose of supporting sporting equipment in a safe, convenient manner are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,628,893 a bow hanger.

U.S. Pat. No. 4,729,363 discloses an archer's bow rest for a tree stand.

U.S. Pat. No. 4,936,415 discloses a bow holder for a tree stand.

U.S. Pat. No. 5,183,231 discloses a bow pod or holder.

U.S. Pat. Des. No. 316,780 discloses the design of a tree stand bow holder.

In this respect, the tree stand bow holder releasably coupled to a tree stand according to the present invention substantially departs from the conventional concepts and designs of the prior art, and in doing so provides an apparatus primarily developed for the purpose of removably coupling a bow to a tree stand for hunting to abate damage to the bow.

Therefore, it can be appreciated that there exists a continuing need for a new and improved tree stand bow holder releasably coupled to a tree stand which can be used for removably coupling a bow to a climbing type or ladder type tree stand for hunting convenience and to abate damage to the bow. In this regard, the present invention substantially fulfills this need.

SUMMARY OF THE INVENTION

In view of the foregoing disadvantages inherent in the known types of devices for supporting bows and other sporting and hunting equipment now present in the prior art, the present invention provides an improved tree stand bow holder releasably coupled to a tree stand. As such, the general purpose of the present invention, which will be described subsequently in greater detail, is to provide a new and improved tree stand bow holder releasably coupled to a tree stand and method which has all the advantages of the prior art and none of the disadvantages.

To attain this, the present invention essentially comprises a new and improved tree stand bow holder releasably coupled to a tree stand comprising, in combination, a pair of spaced U-shaped brackets, each with parallel legs, positionable in a common plane and attachable to a lower portion of the tree stand, the parallel legs of each U-shaped member constituting a bow rest fabricated of steel with a plastic coating, the brackets also including a plate with an aperture mountable to the bottom edge of the tree stand with the legs in an outwardly facing horizontal orientation; a bow holder associated with one bracket, the bow holder consisting of a disk having a tube with threaded apertures therethrough, formed with the disk as a threaded cylindrical extension projecting from the disk, the disk being positionable on the top side of the legs with the threaded tube extending therethrough for coupling purposes by a threaded rod adapted to be threadably secured into the stabilizer hole of a bow; a bolt and an associated wing nut extending through the aperture of the plate adapted to be coupled through an aperture in the bottom edge of the tree stand; an elastic strap having opposed ends, each opposed end having an aperture with an s-shaped hook removably secured therethrough, the s-shaped hooks adapted to be suspended to a tree stand with the central extent of the strap extending down and around the central extent of the bow; and rubber protective pads with peel-off plastic strips to expose self-sticking adhesive secured to the bottom edge of the tree stand to constitute a surface to protect the bow against abrasion from the tree stand.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree stand bow holder releasably coupled to a tree stand which have all the advantages of the prior art devices for supporting bows and other sporting and hunting equipment and none of the disadvantages.

It is another object of the present invention to provide a new and improved tree stand bow holder releasably coupled to a tree stand which may be easily and efficiently manufactured and marketed.

It is further object of the present invention to provide a new and improved tree stand bow holder releasably coupled to a tree stand which are of durable and reliable constructions.

An even further object of the present invention is to provide a new and improved tree stand bow holder releasably coupled to a tree stand which is susceptible of a low cost of manufacture with regard to both materials and labor, and which accordingly is then susceptible of low prices of sale to the consuming public, thereby making such a tree stand bow holder releasably coupled to a tree stand economically available to the buying public.

Still yet another object of the present invention is to provide a new and improved tree stand bow holder releasably coupled to a tree stand which provides in the apparatuses and methods of the prior art some of the advantages thereof, while simultaneously overcoming some of the disadvantages normally associated therewith.

Still another object of the present invention is to removably couple a bow to a tree stand for hunting to abate damage to the bow.

Lastly, it is an object of the present invention to provide a new and improved tree stand bow holder releasably coupled to a climbing or ladder-type tree stand comprising a pair of spaced U-shaped brackets, each with parallel legs, positionable in a common plane and attachable to a lower portion of the tree stand, the parallel legs of each U-shaped member constituting a bow rest fabricated of steel with a plastic coating, the brackets also including a plate with an aperture mountable to the bottom edge of the tree stand with the legs in an outwardly facing horizontal orientation; a bow holder associated with one bracket, the bow holder consisting of a disk having a tube with threaded apertures therethrough, formed with the disk as a threaded cylindrical extension projecting from the disk, the disk being positionable on the top side of the legs with the threaded tube extending therethrough for coupling purposes by a threaded rod adapted to be threadably secured into the stabilizer hole of a bow; and an elastic strap having opposed ends, each opposed end having an aperture with a hook removably secured therethrough, the hooks adapted to be suspended to a tree stand with the central extent of the strap extending down and around the central extent of the bow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
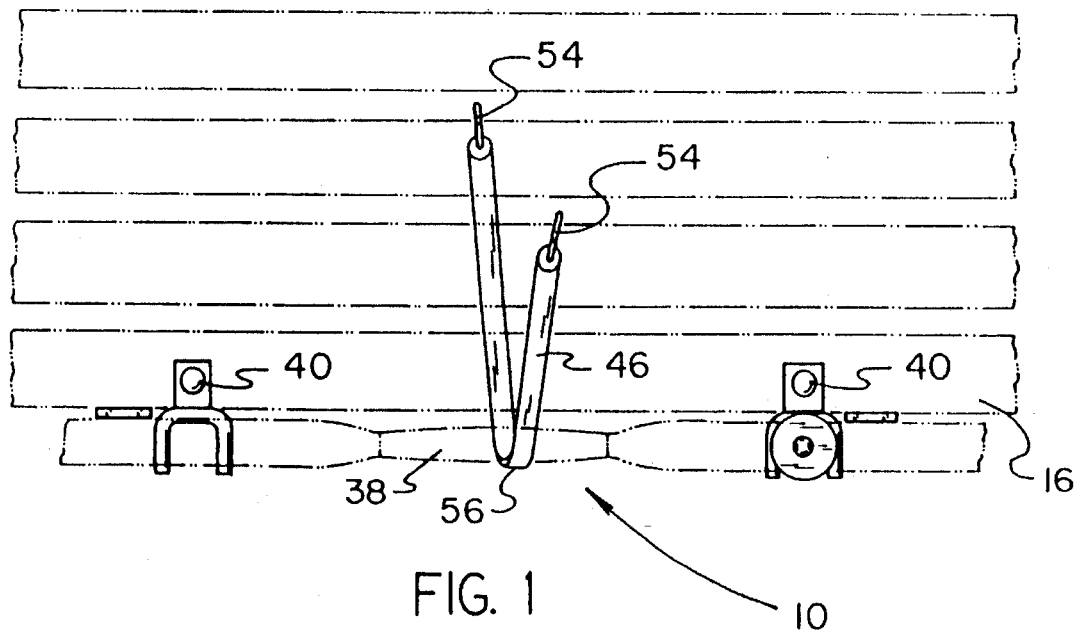
FIG. 1 is a front elevational view of the preferred embodiment of the new and improved tree stand bow holder releasably coupled to a tree stand constructed in accordance with the principles of the present invention.
Figure 2:
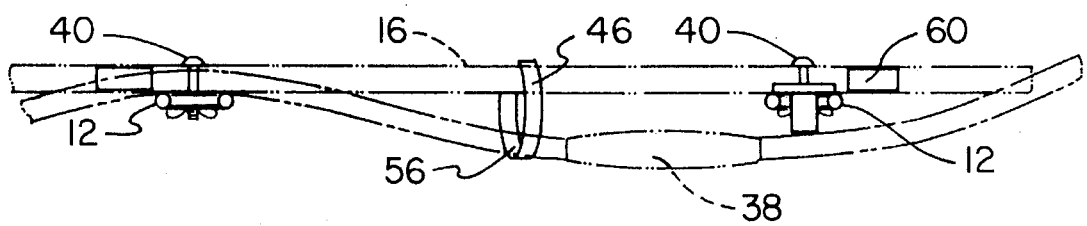
FIG. 2 is a front view of FIG. 1.
Figure 3:
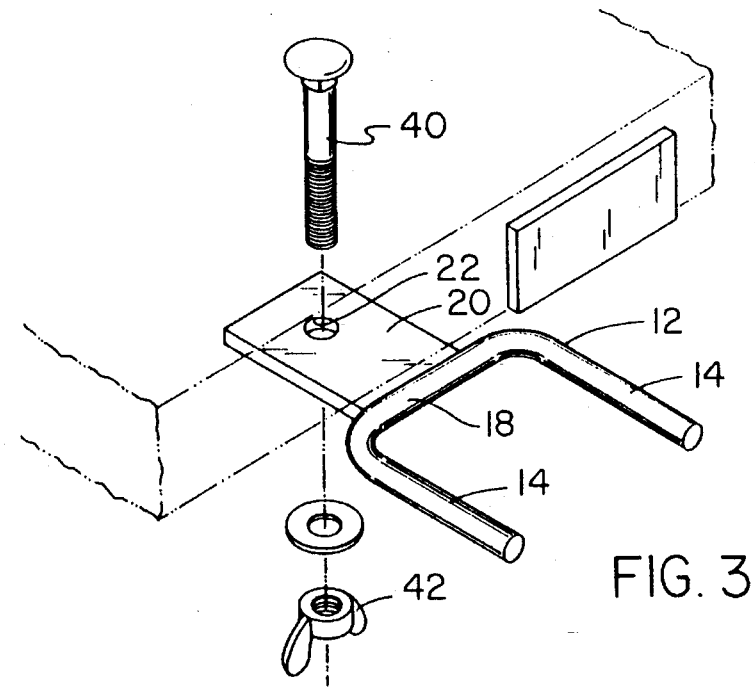
FIG. 3 is a perspective illustration of one of the U-shaped members for supporting a bow in an intended orientation.
Figure 4:
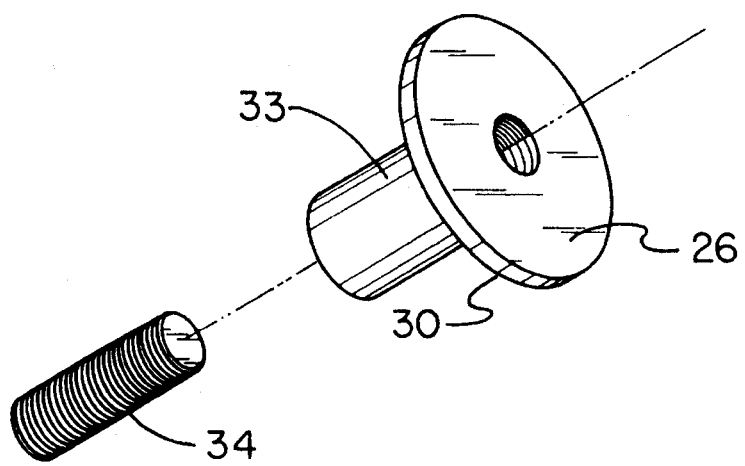
FIG. 4 is an exploded perspective view of a bow holder utilized in association with the elements of FIG. 3.
Figure 5:
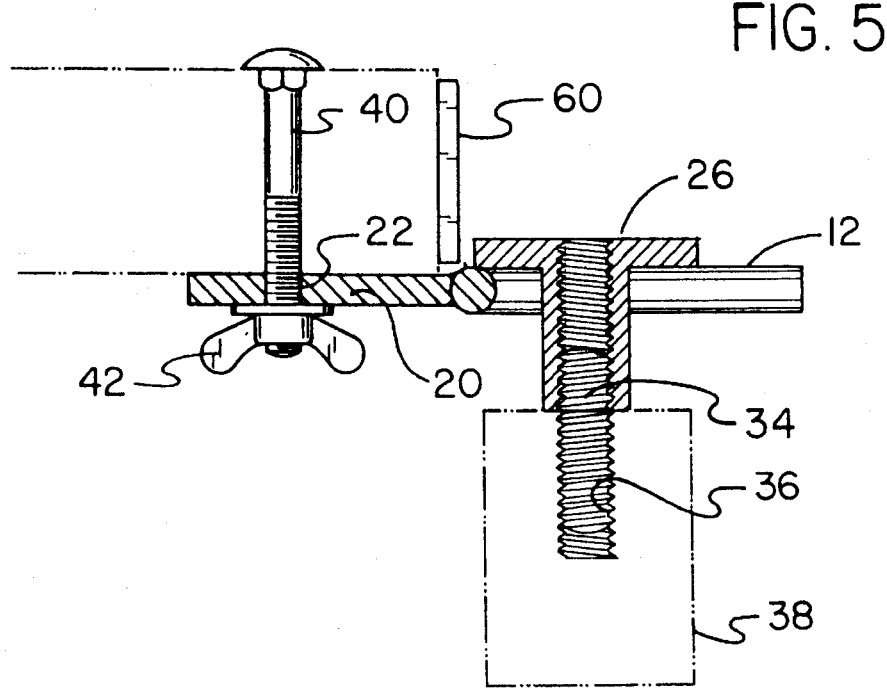
FIG. 5 is a cross-sectional view of the bow holder of FIG. 4 combined with the bow rest of FIG. 3.
Figure 6:
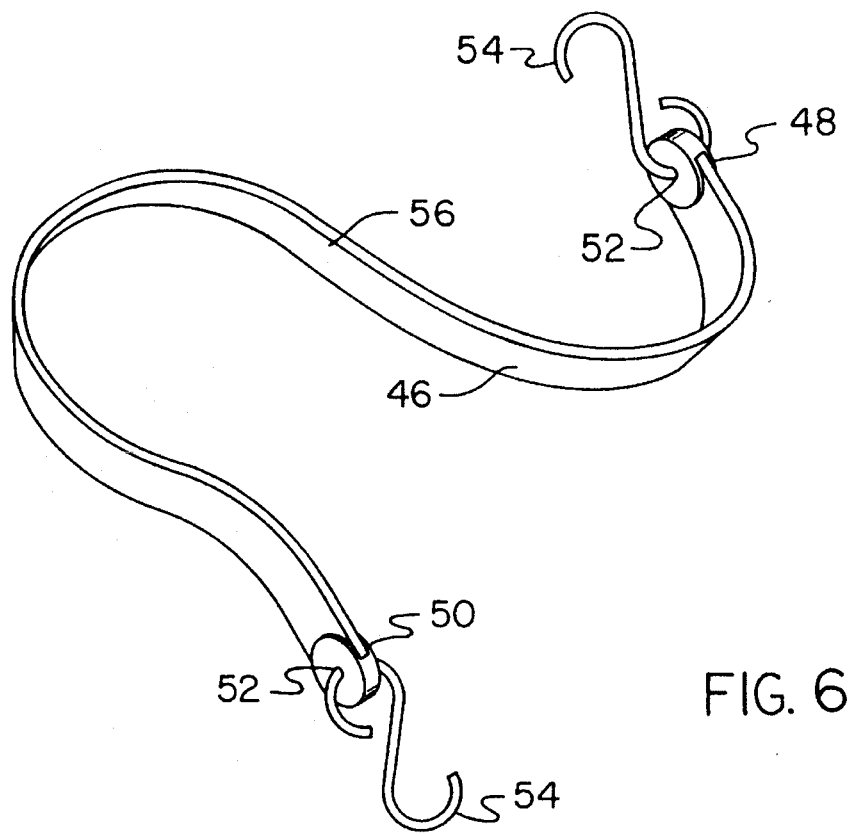
FIG. 6 is a perspective view of the strap utilized for supporting the central extent of the bow as shown in FIG. 1.
Figure 7:
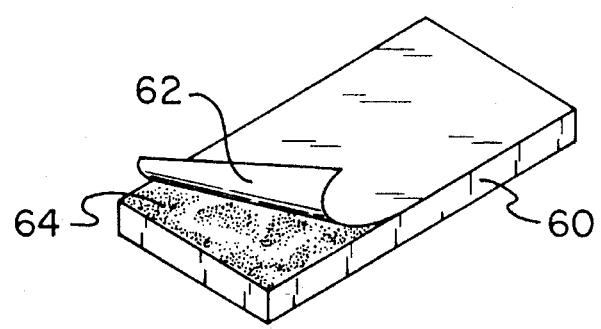
FIG. 7 is a perspective view of the one of the rubber protective pads with a peel-off strip.

With reference now to the drawings, and in particular to FIG. 1 thereof, the preferred embodiment of the new and improved tree stand bow holder releasably coupled to a tree stand embodying the principles and concepts of the present invention and generally designated by the reference numeral 10 will be described.

The present invention, the new and improved tree stand bow holder releasably coupled to a tree stand, is comprised of a plurality of components. Such components, in their broadest context, include a pair of spaced U-shaped brackets, a bow holder associated with one bracket, two bolts and two wing nuts, an elastic strap and rubber protective pads. The individual components are specifically constructed and correlated with respect to each other so as to attain the desired objectives.

More specifically, the central component of the system 10 is a pair of U-shaped brackets 12. Each bracket is provided with a pair of parallel legs 14. The legs of the bracket are positionable in a common horizontal plane. They are adapted to be attached to a lower portion of a tree stand 16. The parallel legs of each U-shaped member constitute a bow rest 18. The bow rest is fabricated of steel with a plastic coating to abate abrasion of the bow. The brackets also include a plate 20. The plate has an aperture 22. The aperture is for mounting to the bottom edge of the tree stand. The plate is in a common plane with the parallel legs. The legs are adapted to extend outwardly in a horizontal orientation from the tree stand.

Next provided is a bow holder 26. The bow holder is associated with a related bracket 18. The bow holder is formed of a disk 30. The disk has a tube 33 with a threaded aperture therethrough. The tube is formed with the disk as a threaded cylindrical extension projecting from the disk. The disk is positionable on the top side of the legs. In addition, a threaded rod 34 extends through the tube for coupling purposes. The outer extent of the threaded rod is adapted to be threadably secured into the stabilizer hole 36 of a bow 38. Coupling of the brackets and bow holders to the tree stand is effected through a bolt 40 and an associated wing nut 42. The bolt extends through the aperture of the plate. In this manner, coupling may be effected through an aperture 44 in the bottom edge of the tree stand.

The central extent of the bow is supported through an elastic strap 46. Such straps has opposed ends 48 and 50. Each opposed end has an aperture 52. In addition, an S-shaped hook 54 is removably secured through such aperture. The S-shaped hooks are adapted to be suspended to the tree stand. A central extent 56 of the strap extends downwardly and around the central extent of the bow for support purposes.

The last component of the system 10 is one or more protective pad 60. The pads are provided with a peel-off plastic strip 62. Between the strip and pad is a self-sticking adhesive 64. The adhesive is for securing the pads to the bottom edge of the tree stand. The pad will thus constitute a surface to protect the bow against abrasion from the tree stand.

The present invention allows for simple, secure and rugged temporary attachment of the bow to the tree stand at ground level, with convenient release at hunting level.

The first part is the bow rest mentioned above. Most are U-shaped ¼ inch rods covered with plastic that mount on the front of the tree stand. Usually, only one is needed; for this use, two are required. This has the added benefit of choice of which side to have your bow on once up the tree. The bow rests are usually mounted with ¼ inch bolts and wing nuts.

The second part is a rubber tiedown strap with an "S" hook on each end. This is stretched around the tree stand to store it when not in use.

The third part is a washer and tapped extension rod that screws into the stabilizer hole of the bow with threaded rod that still allows for attachment of a stabilizer or other common items.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved tree stand bow holder releasably coupled to a tree stand comprising, in combination:

a pair of spaced U-shaped brackets, each with parallel legs, positionable in a common plane and attachable to a lower portion of the tree stand, the parallel legs of each U-shaped member constituting a bow rest fabricated of steel with a plastic coating, the brackets also including a plate with an aperture mountable to the bottom edge of the tree stand with the legs in a outwardly facing horizontal orientation;

a bow holder associated with one bracket, the bow holder consisting of a disk having a tube with threaded apertures therethrough, formed with the disk as a threaded cylindrical extension projecting from the disk, the disk being positionable on the top side of the legs with a threaded tube extending therethrough for coupling purposes by a threaded rod adapted to be threadably secured into the stabilizer hole of a bow;

a bolt and an associated wing nut extending through the aperture of the plate adapted to be coupled through an aperture in the bottom edge of the tree stand;

an elastic strap having opposed ends, each opposed end having an aperture with an s-shaped hook removably secured therethrough, the s-shaped hooks adapted to be suspended to a tree stand with the central extent of the strap extending down and around the central extent of the bow; and rubber protective pads with peel-off plastic strips to expose self-sticking adhesive secured to the bottom edge of the tree stand to constitute a surface to protect the bow against abrasion from the tree stand.

2. A tree stand bow holder releasably coupled to a climbing or ladder-type tree stand comprising:

a pair of spaced U-shaped brackets, each with parallel legs, positionable in a common plane and attachable to a lower portion of the tree stand, the parallel legs of each U-shaped member constituting a bow rest fabricated of steel with a plastic coating, the brackets also including a plate with an aperture mountable to the bottom edge of the tree stand with the legs in an outwardly facing horizontal orientation;

a bow holder associated with one bracket, the bow holder consisting of a disk having a tube with threaded apertures therethrough, formed with the disk as a threaded cylindrical extension projecting from the disk, the disk being positionable on the top side of the legs with a threaded rod extending therethrough for coupling purposes by a threaded rod adapted to be threadably secured into the stabilizer hole of a bow; and an elastic strap having opposed ends, each opposed end having an aperture with a hook removably secured therethrough, the hooks adapted to be suspended to a tree stand with the central extent of the strap extending down and around the central extent of the bow.

3. The device as set forth in claim 2 and further including:

a bolt and an associated wing nut extending through the aperture of the plate adapted to be coupled through an aperture in the bottom edge of the tree stand.

4. The device as set forth in claim 2 and further including:

rubber protective pads with peel-off plastic strips to expose self-sticking adhesive secured to the front edge of the tree stand to constitute a surface to protect the bow against abrasion from the tree stand.

* * * * *